United States Patent
Yakovlev et al.

(10) Patent No.: US 10,430,201 B1
(45) Date of Patent: Oct. 1, 2019

(54) MULTI-PLATFORM FIRMWARE SUPPORT

(71) Applicant: American Megatrends International, LLC, Norcross, GA (US)

(72) Inventors: Sergiy Yakovlev, Duluth, GA (US); Oleksiy Yakovlev, Lawrenceville, GA (US)

(73) Assignee: American Megatrends International, LLC, Norcross, GA (US)

( * ) Notice: Subject to any disclaimer, the term of this patent is extended or adjusted under 35 U.S.C. 154(b) by 140 days.

(21) Appl. No.: 15/496,809

(22) Filed: Apr. 25, 2017

(51) Int. Cl.
  *G06F 9/44* (2018.01)
  *G06F 9/4401* (2018.01)
  *G06F 1/32* (2019.01)

(52) U.S. Cl.
  CPC ............ *G06F 9/441* (2013.01); *G06F 9/4411* (2013.01); *G06F 1/32* (2013.01)

(58) Field of Classification Search
  CPC .................. G06F 1/32; G06F 1/26; G06F 1/00
  See application file for complete search history.

(56) References Cited

U.S. PATENT DOCUMENTS

| | | | | |
|---|---|---|---|---|
| 7,873,807 B1* | 1/2011 | Polyudov | .............. | G06F 9/4401 711/154 |
| 8,370,618 B1* | 2/2013 | Yakovlev | .............. | G06F 13/102 709/222 |
| 2005/0108237 A1* | 5/2005 | Sonoda | ................. | G06F 16/182 |
| 2006/0074952 A1* | 4/2006 | Rothman | .............. | G06F 9/4451 |
| 2006/0143473 A1* | 6/2006 | Kumar | .................... | G06F 21/10 713/189 |
| 2009/0150908 A1* | 6/2009 | Shankaranarayanan | ..................... | G06F 9/466 719/320 |
| 2016/0188345 A1* | 6/2016 | Chen | ..................... | G06F 9/4403 713/2 |
| 2017/0249155 A1* | 8/2017 | Sundrani | ............... | G06F 9/4401 |

* cited by examiner

*Primary Examiner* — Jaweed A Abbaszadeh
*Assistant Examiner* — Keshab R Pandey
(74) *Attorney, Agent, or Firm* — Newport IP, LLC Shigeta | Hope

(57) ABSTRACT

A computer system accesses a multiplatform firmware image to obtain a GUID identifying a platform for the computer system. The multiplatform firmware image includes a core firmware volume and a plurality of platform-specific firmware volumes. The computer system installs a platform identifier interface including the GUID. The computer system executes files within a platform-specific firmware volume including the GUID and a file of the core firmware volume including the GUID based at least in part on dependency expressions of the executed files and the platform identifier interface.

20 Claims, 6 Drawing Sheets

MULTI-PLATFORM FIRMWARE SUPPORT

BACKGROUND

It is not uncommon for an original equipment manufacturer ("OEM") to develop and manufacture different versions of the same computer system motherboard. These different versions of the same computer system motherboard are commonly referred to as "platforms." For example, multiple versions of a server motherboard can be developed that have many hardware components, such as a chip set, in common. These different versions of the same motherboard can also have different hardware components. One version of a server motherboard might include, for instance, hardware support for redundant array of inexpensive disks ("RAID"). Another variation of the same motherboard might include additional hardware network adapters or other differentiating hardware components.

Different platforms commonly require firmware containing different executable code and static data in order to support their operation. For example, and without limitation, different platforms might require different firmware drivers or different static data, such as interrupt request ("IRQ") routing tables, setup screens or defaults, and system management BIOS ("SMBIOS") data. A single firmware that supports multiple platforms is utilized in some computing systems. Such firmware can, however, be complex, difficult to test and maintain, bloated, and inefficient. As a result, such firmware can be unreliable and negatively impact the performance of computing systems that utilize such firmware.

It is with respect to these and other considerations that the disclosure made herein is presented.

SUMMARY

Technologies are described herein for providing multi-platform support in a computer system firmware. Through an implementation of the technologies disclosed herein, a single firmware that supports multiple hardware platforms can be generated in a simple and efficient manner. These mechanisms can also reduce the time required for development and testing of computer system firmware for multiple hardware platforms and, potentially, reduce the number of errors found in computer system firmware. Technical benefits other than those specifically mentioned herein can also be realized through an implementation of the technologies disclosed herein.

In one aspect, a non-transitory computer-readable storage medium—storing a multiplatform firmware image which can be used to boot a computer implementing one of a plurality of platforms—includes a core firmware volume and one or more platform-specific firmware volumes. The core firmware volume includes common files used by each of the plurality of platforms and at least one file used by some of the plurality of platforms and not the others of the plurality of platforms. The one or more platform-specific firmware volumes includes files used by their respective platform that are different in more than one platform.

In another aspect, a method generates a non-transitory computer-readable storage medium by accessing a plurality of platform-specific firmware images. The method identifies a first file that is the same in all of the plurality of platform-specific firmware images and a second file having a first version in a first of the plurality of platform-specific firmware images and a second version in a second of the plurality of platform-specific firmware images. The first file and the first version of the second file are copied to a core firmware volume of a multiplatform firmware image, and the second version of the second file is copied to a platform-specific firmware volume of the multiplatform firmware image. The method modifies the first version of the second file to execute when a computer boots using a platform corresponding to the second of the plurality of platform-specific firmware images. In one implementation, the method modifies the dependencies of the first version of the second file to include global unique identifiers (GUIDs) of the platform corresponding to the second of the plurality of platform-specific firmware images.

In another aspect, at boot time, a computer system accesses a multiplatform firmware image to obtain a GUID identifying a platform for the computer system. The multiplatform firmware image includes a core firmware volume and a plurality of platform-specific firmware volumes. The computer system installs a platform identifier interface including the GUID. The computer system executes files within a platform-specific firmware volume including the GUID and a file of the core firmware volume including the GUID based at least in part on dependency expressions of the executed files and the platform identifier interface.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing multiplatform support in a computer system firmware. As discussed briefly above, through an implementation of the technologies disclosed herein, a single firmware that supports multiple hardware platforms can be generated in a simple and efficient manner. These mechanisms can also reduce the time required for development and testing of computer system firmware for multiple hardware platforms and, potentially, reduce the number of errors found in computer system firmware. Additional details regarding these aspects will be provided below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
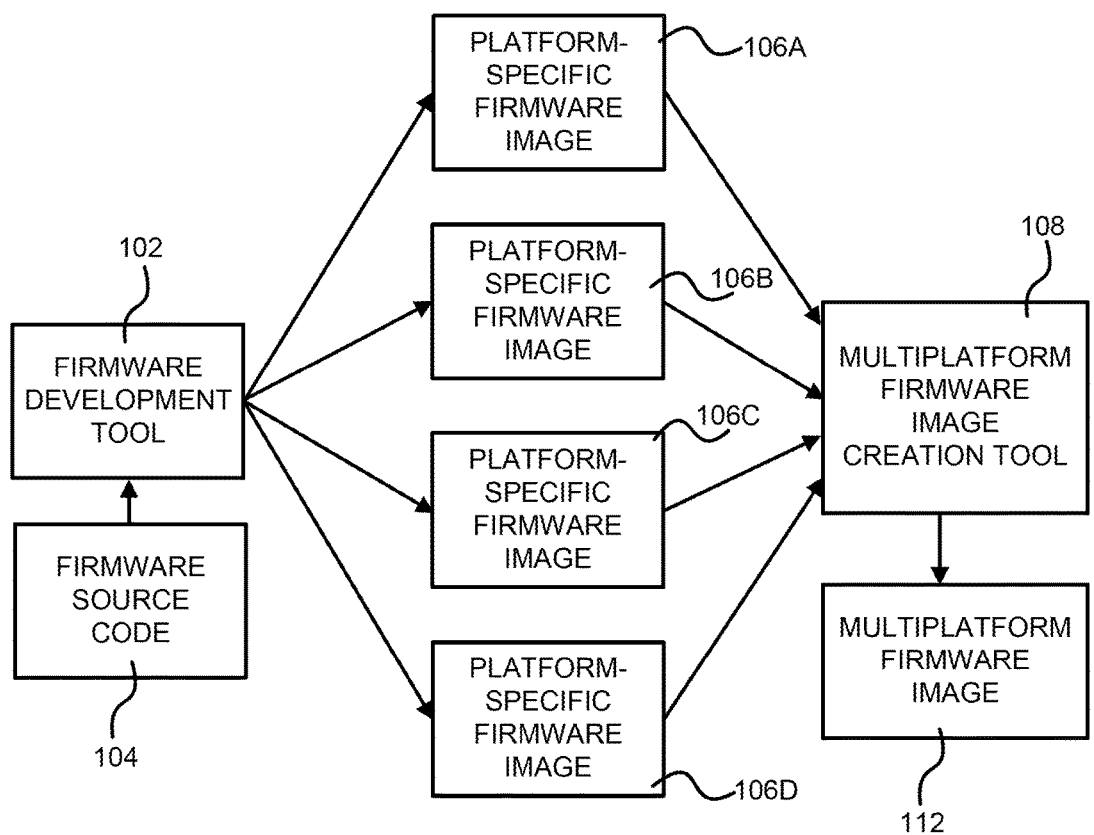
FIG. 1 is a software architecture diagram illustrating aspects of the operation of a firmware development tool and a multiplatform firmware image creation tool, according to one or more configurations presented herein.

FIG. 1 is a software architecture diagram illustrating aspects of the operation of a firmware development tool 102 and a multiplatform firmware image creation tool 108, according to one or more configurations presented herein. As shown in FIG. 1, a firmware development tool 102 can be utilized to create firmware source code 104. The firmware source code 104 is source code for implementing a computer system firmware for use in multiple computing system platforms. A platform is a specific hardware implementation of a computing system. The different platforms can have various hardware components in common. For example, and without limitation, multiple versions of a server motherboard can be developed that have many hardware components, such as a chip set, in common.

These different versions of the same motherboard can also have different hardware components. One version of a server motherboard might include, for instance, hardware support for redundant array of inexpensive disks ("RAID"). Another variation of the same motherboard might include additional hardware network adapters or other differentiating hardware components. As shown in FIG. 1, the firmware development tool 102 can be utilized to generate platform-specific firmware images 106A-106D. Each of the platform-specific firmware images 106A-106D includes executable firmware files for supporting a different platform.

Figures 2A, 2B:
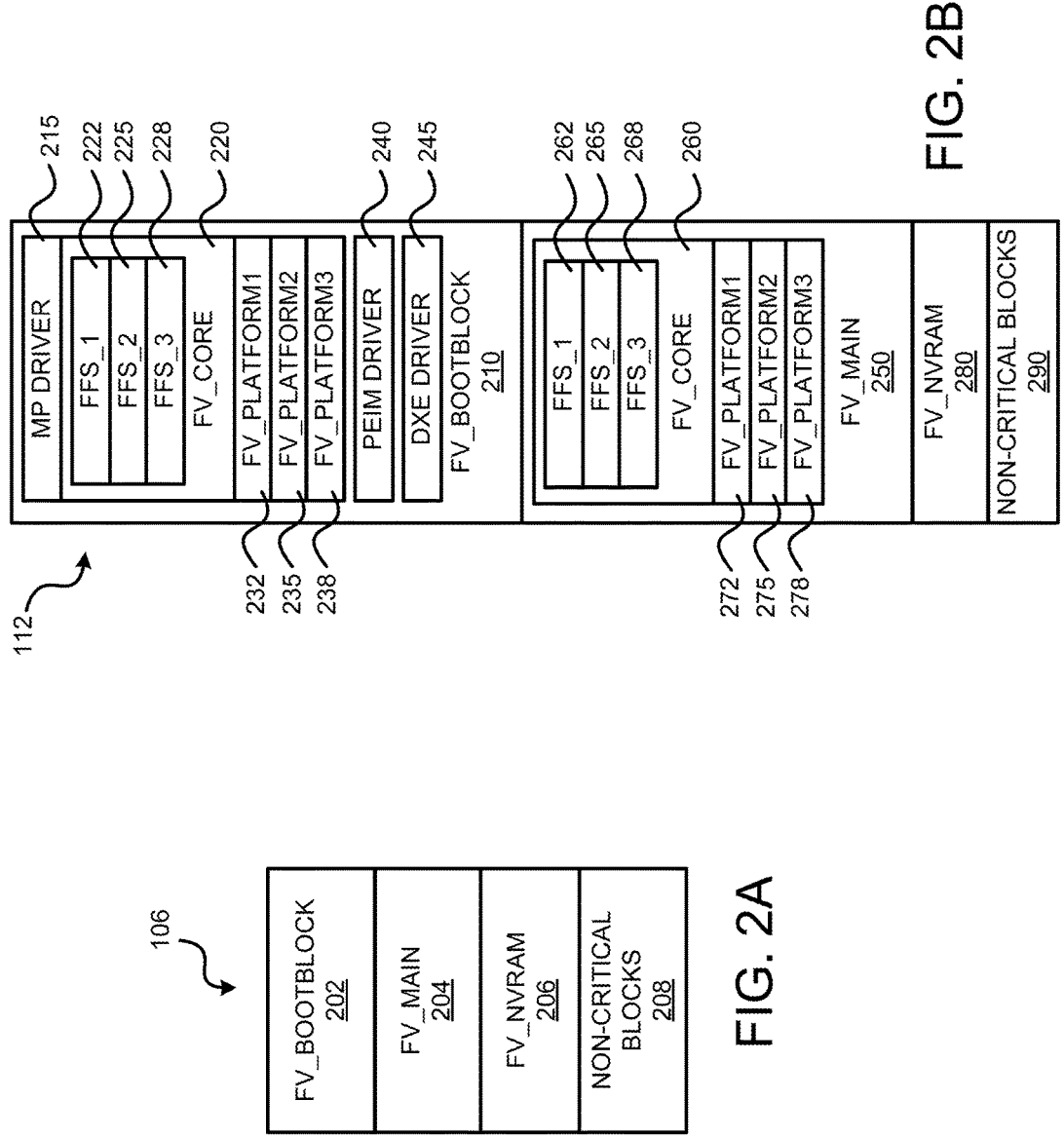
FIGS. 2A and 2B are data structure diagrams illustrating aspects of the configuration of a platform-specific firmware image and a multiplatform firmware image, respectively, according to one configuration presented herein.

Turning momentarily to FIG. 2A, additional details regarding the structure of a platform-specific firmware image 106 will be provided. In particular, in one configuration the platform-specific firmware image 106 includes a boot block firmware file system ("FFS") volume 202 ("FV_BOOTBLOCK") that includes uncompressed program code that is executed upon initial power-up of a computing system. The platform-specific firmware image 106 also includes a main FFS volume 204 ("FV_MAIN") that stores the remainder of the firmware in a compressed format. The boot block FFS volume 202 can also include program code for decompressing and publishing the contents of the main FFS volume 204.

The platform-specific firmware image 106 also includes an FFS volume 206 ("FV_NVRAM") that includes the contents of NVRAM for the computer system executing the firmware. The platform-specific firmware image 106 can also include other non-critical blocks 208 in some configurations.

Turning back to FIG. 1, additional aspects of the creation of a multiplatform firmware image 112 will be described. As shown in FIG. 1, a software multiplatform firmware image creation tool 108 obtains the platform-specific firmware images 106A-106D for the multiple computing platforms. Using the platform-specific firmware images 106A-106D, the multiplatform firmware image creation tool 108 creates a multiplatform firmware image 112. The multiplatform firmware image 112 is a single firmware image that supports the platforms supported by the platform-specific firmware images 106A-106D. Although four different platforms are represented in FIG. 1, it is to be appreciated that the multiplatform firmware image 112 can support other numbers of platforms in other configurations.

Turning momentarily to FIG. 2B, details regarding a format utilized by the multiplatform firmware image 112 in one particular configuration will be provided. As shown in FIG. 2B, the multiplatform firmware image 112 includes a boot block FFS volume 210 ("FV_BOOTBLOCK") that includes uncompressed program code that is executed upon initial power-up of a computing system. According to some embodiments, the boot block FFS volume 210 includes a core FFS volume 220 and platform-specific FFS volumes 232, 235, 238. Like the boot block FFS volume 210, the core FFS volume 220 and the platform-specific FFS volumes 232, 235, 238 can include uncompressed program code that is executed upon initial power-up of a computing system.

In some embodiments, the core FFS volume 220 can include one or more uncompressed FFS files 222, 225, 228. The uncompressed FFS files 222, 225, 228 can include FFS files that are common in each of the platform-specific firmware images 106A-106D, e.g., the FFS files 222, 225, 228 may be present in each of the uncompressed portions of platform-specific firmware images 106A-106D. In some embodiments, the pre-EFI module (PEIM) dispatcher launching the FFS files 222, 225, 228 during boot will execute each of the FFS files 222, 225, 228 regardless of the platform being launched. In some embodiments, the PEIM driver 240 may include functionality for implementing the PEIM dispatcher.

In some embodiments, one or more of uncompressed FFS files 222, 225, 228 may be unique to one of the platform-specific firmware images 106A-106D. In such embodiments, the FFS files 222, 225, 228 that are unique to one of the platform-specific firmware images 106A-106D may include a reference to the globally unique identifier (GUID)

of the platform-specific firmware image for which the FFS files 222, 225, 228 are unique. The GUID reference in the FFS files 222, 225, 228 can be part of the dependency expression (DEPEX) of the FFS files 222, 225, 228. As explained below, during the execution of the multiplatform firmware image 112, the PEIM driver 240 may install a PEIM-to-PEIM interface (PPI) that includes the GUID of the detected platform. By including the GUID in the DEPEX of the FFS files 222, 225, 228, the PEIM dispatcher launching each of the FFS files 222, 225, 228 during boot will only launch the FFS files 222, 225, 228 for their respective platforms when the GUID is present in the PPI. For example, FFS_3 228 may be part of platform-specific firmware image 106C, but not be part of platform-specific firmware images 106A, 106B, or 106D. In this example, FFS_3 228 includes the GUID of the platform for platform-specific firmware image 106C in its DEPEX. During boot of the platform for platform-specific firmware image 106C, the PEIM driver 240 may install a PPI with the GUID for the platform, and the PEIM dispatcher will launch the FFS_3 228 because the condition of its DEPEX (e.g., the GUID of the platform) is satisfied. However, during boot of the platform implementing platform-specific firmware image 106A, the PEIM driver 240 will not launch the FFS_3 228 because the conditions of its DEPEX are not satisfied—the PEIM driver 240 did not install the GUID for the platform corresponding to platform-specific firmware image 106C, rather it installed the GUID for the platform corresponding to platform-specific firmware image 106A.

The boot block FFS volume 210 can also include one or more platform-specific FFS volumes 232, 235, 238. For example, the platform-specific FFS volume 232 can include files that are specific to the platform-specific firmware image 106A, the platform-specific FFS volume 235 can include files that are specific to the platform-specific firmware images 106C, and the platform-specific FFS volume 238 can include files that are specific to the platform-specific firmware image 106C. In some embodiments, one or more of platform-specific firmware images 106A-106D may not have a corresponding platform-specific FFS volume in the boot block FFS volume 210. In some embodiments, the DEPEX of each platform-specific firmware volume 232, 235, 238 refers to the GUID of their respective platform so that the PEIM dispatcher launches the platform-specific firmware volumes when their respective platform is detected.

In one configuration, the boot block FFS volume 210 can also include a PEIM driver 240. As discussed below, the PEIM driver 240 includes functionality for identifying a platform upon which a firmware is executing and then loading the firmware files specific to the identified firmware into memory for execution. The PEIM driver 240 may also include functionality for supporting the launch of the uncompressed code of the boot block FFS volume 210 during the pre-EFI (PEI) phase of the boot sequence and uncompressing the main FFS volume 250. The PEIM driver 240 can also perform the functionality associated with the PEIM dispatcher, e.g., publishing FFS volumes, unpackaging FFS volumes, and launching them consistent with the Unified Extensible Firmware Interface (UEFI) specification. In some embodiments, the boot block FFS volume 210 can also include a driver execution environment (DXE) driver 245. As discussed below, The DXE driver 245 includes functionality for supporting the launch of compressed code of the main FFS volume 250 during the DXE phase of the boot sequence and for performing other functionality consistent with a DXE dispatcher consistent with the UEFI Specification. While FIG. 2B shows the DXE driver 245 as part of the boot block FFS volume 210, in some embodiments, the DXE driver 245 may be part of the main FFS volume 250.

In some embodiments, the boot block FFS volume 210 includes a multiplatform driver 215 ("MP DRIVER"). The multiplatform driver 215 can include the GUIDs for each of the platforms corresponding to the platform-specific images 106 and other information that may be useful to developers or needed to boot computers implementing the platforms per the UEFI Specification (e.g., string descriptions of the platforms, SKU IDs, etc.).

As also shown in FIG. 2B, the multiplatform firmware image 112 also includes a main FFS volume 250 ("FV_MAIN"). The main FFS volume 250 can store uncompressed program files and drivers which may be executed in the DXE phase of the boot sequence or when system memory (e.g., memory in addition to processor cache memory) is available. According to some embodiments, the main FFS volume 250 includes a core FFS volume 260 and platform-specific FFS volumes 272, 275, 278. Like the main FFS volume 250, the core FFS volume 260 and the platform-specific FFS volumes 272, 275, 278 can include compressed program files and drivers that are executed once system memory becomes available, such as when the boot sequence enters the DXE phase.

In some embodiments, the core FFS volume 260 can include one or more compressed FFS files 262, 265, 268. The compressed FFS files 262, 265, 268 can include FFS files that are common to each of the platform-specific firmware images 106A-106D, e.g., the FFS files 262, 265, 268 may be present in each of the compressed portions of platform-specific firmware images 106A-106D. In some embodiments, the DXE dispatcher launching the FFS files 262, 265, 268 during boot will execute each of the FFS files 262, 265, 268 regardless of the platform being launched.

In some embodiments, one or more of compressed FFS files 262, 265, 268 may be unique to one of the platform-specific firmware images 106A-106D. In such embodiments, the compressed FFS files 262, 265, 268 that are unique to one of the platform-specific firmware images 106A-106D may include a reference to the globally unique identifier (GUID) of the platform-specific firmware image for which the FFS files 262, 265, 268 are unique. The GUID reference in the FFS files 262, 265, 268 can be part of the dependency expression (DEPEX) of the FFS files 262, 265, 268. As explained below, during the execution of the multiplatform firmware image 112, the DXE driver 245 may access a hand-off block (HOB) provided by the PEIM driver 240 that includes the GUID of the platform detected by the PEIM driver 240. The DXE driver 245 may install a protocol with the GUID from the HOB, which can be used during dispatch to launch the drivers having a dependency on the GUID. By including the GUID in the DEPEX of the FFS files 262, 265, 268, the DXE dispatcher launching each of the FFS files 262, 265, 268 during boot will only launch the FFS files 262, 265, 268 for their respective platforms when the GUID is present in the HOB. For example, FFS_2 265 may be part of platform-specific firmware image 106B, but not be part of platform-specific firmware images 106A, 106C, or 106D. In this example, FFS_2 265 includes the GUID of the platform for platform-specific firmware image 106B in its DEPEX. During boot of the platform for platform-specific firmware image 106B, the DXE driver 245 may reference the GUID from the HOB received from the PEIM driver 240, and the DXE dispatcher will launch the FFS_2 265 because the condition of its DEPEX (e.g., the GUID of the platform) is satisfied. However, during boot of the platform implementing platform-specific firmware image 106A, the DXE driver 245 will not launch the FFS_2 265 because the conditions of its DEPEX are not satisfied—the HOB did not include the GUID for the platform corresponding to platform-specific firmware image 106B, rather it included the GUID for the platform corresponding to platform-specific firmware image 106A.

In one configuration, the main FFS volume 250 also includes nested platform-specific FFS volumes 272, 275, 278. The platform-specific FFS volumes 272, 275, 278 include program and driver files that are specific to the platform-specific firmware images 106A-106D. For example, the platform-specific FFS volume 272 can include files that are specific to the platform-specific firmware image 106A, the platform-specific FFS volume 275 can include files that are specific to the platform-specific firmware images 106C, and the platform-specific FFS volume 278 can include files that are specific to the platform-specific firmware image 106C. In some embodiments, one or more of platform-specific firmware images 106A-106D may not have a corresponding platform-specific FFS volume in the main FFS volume 250. In some embodiments, the DEPEX of each platform-specific FFS volume 272, 275, 278 refers to the GUID of their respective platform so that the DXE dispatcher launches the platform-specific FFS volumes when their respective platform is detected.

As shown in FIG. 2B, the multiplatform firmware image 112 can also include a FFS volume 280 for storing the contents of NVRAM and a FFS volume 290 for storing other non-critical blocks. Although FIG. 2B shows uncompressed core FFS volume 220 and uncompressed platform-specific FFS volumes 232, 235, 238 as part of boot block FFS volume 210, some embodiments of multiplatform firmware image 112 may not include any of uncompressed core FFS volume 220 or uncompressed platform-specific FFS volumes 232, 235, 238. In such embodiments, platform-specific firmware images 106A-106D may have no differences in their respective boot block FFS volumes 202, or have differences leading to having uncompressed platform-specific FFS volumes 232, 235, 238 consistent with disclosed embodiments. Also, while FIG. 2B shows compressed core FFS volume 260 and compressed platform-specific FFS volumes 272, 275, 278 as part of main FFS volume 250, some embodiments of multiplatform firmware image 112 may not include any of compressed core FFS volume 260 or uncompressed platform-specific FFS volumes 272, 275, 278. In such embodiments, platform-specific firmware images 106A-106D may have no differences in their respective main FFS volumes 204, or have differences leading to having compressed platform-specific FFS volumes 272, 275, 278 consistent with disclosed embodiments.

Referring back to FIG. 1, additional aspects of the creation of the multiplatform firmware image 112 will be described. In particular, in order to generate the multiplatform firmware image 112, the multiplatform firmware image creation tool 108 performs a discovery phase and an execution phase. During the discovery phase, the multiplatform firmware image creation tool 108 identifies those firmware files that are common across all of the platform-specific firmware images 106A-106D. The multiplatform firmware image creation tool 108 also identifies those files that are in two or more of the platform-specific firmware images 106A-106D, but not in all of the platform-specific firmware images 106A-106D. The multiplatform firmware image creation tool 108 also identifies those files that are unique to each of the platform-specific firmware images 106A-106D. In some embodiments, the multiplatform firmware image creation tool 108 may create a report (not shown in FIG. 1) listing the common and different files in the platform-specific firmware images 106A-106D.

During the execution phase of operation, the multiplatform firmware image creation tool 108 utilizes the report generated during the discovery phase to generate the multiplatform firmware image 112. In particular, the multiplatform firmware image creation tool 108 copies the files that the platform-specific firmware images 106A-106D have in common to the core FFS volume 220 (for uncompressed files) and/or to the core FFS volume 260 (for compressed files). The multiplatform firmware image creation tool 108 may also copy some files that are not the same in the platform-specific firmware images 106A-106D to the core FFS volume 220 (for uncompressed files) and/or to the core FFS volume 260 (for compressed files) depending on various conditions described in more detail below with respect to FIG. 3. The multiplatform firmware image creation tool 108 may copy files to the core FFS volume 220 (for uncompressed files) and/or to the core FFS volume 260 (for compressed files) in an efficient manner to minimize the overall size of the multiplatform firmware image 112, as described in more detail below. For the files that are in some, but not all, of the platform-specific firmware images 106A-106D, the multiplatform firmware image creation tool 108 may modify the DEPEX of each of these copied files to include a dependency on their respective platforms. For example, the multiplatform firmware image creation tool 108 may add the GUID of the respective platform to the files. Additional details regarding this process will be provided below with regard to FIG. 3.

Figure 3:
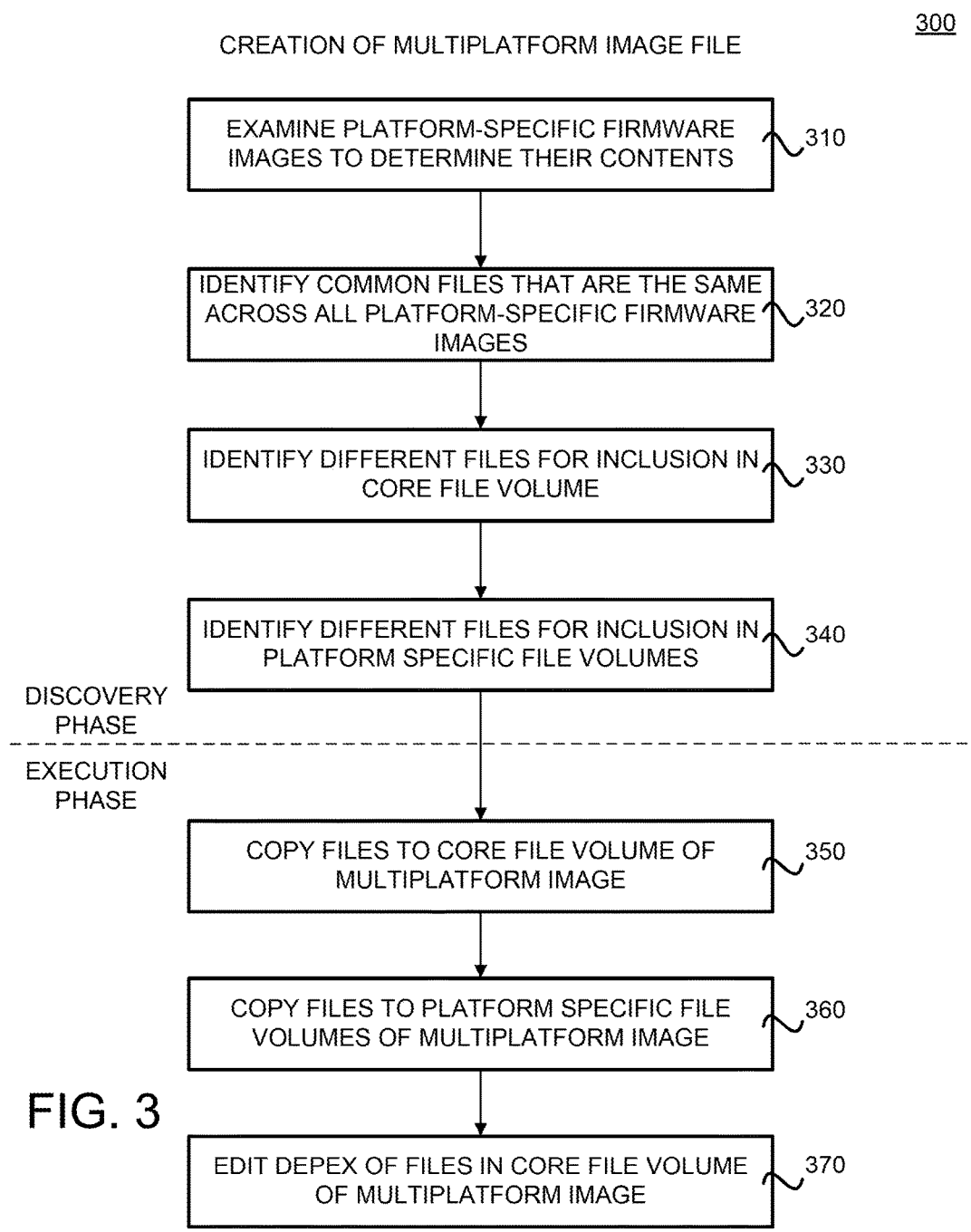
FIG. 3 is a flow diagram showing a routine that illustrates additional aspects of the operation of the multiplatform firmware image creation tool shown in FIG. 1, according to one configuration disclosed herein.

FIG. 3 is a flow diagram showing a creation routine 300 that illustrates additional aspects of the operation of the multiplatform firmware image creation tool 108 shown in FIG. 1 and described above, according to disclosed embodiments. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

As discussed briefly above, in order to generate the multiplatform firmware image 112, the multiplatform firmware image creation tool 108 performs a discovery phase and an execution phase in some embodiments. The discovery phase is illustrated by operations 310-340 of the creation routine 300 and the execution phase is illustrated by operations 350-380 of the creation routine 300.

The discovery phase begins at operation 310 of creation routine 300, where the multiplatform firmware image creation tool 108 examines the platform-specific firmware images 106 to determine their contents. The creation routine 300 then proceeds from operation 310 to operation 320, where the multiplatform firmware image creation tool 108 identifies the common files that are the same across each of the platform-specific firmware images 106. The common files can be identified, for example, using the globally unique identifier ("GUID") assigned to each of the files and by comparing the binaries of those files having the same GUID. When each platform-specific image 106 has a file with the same GUID and/or the same binary, the file may be considered the same across the platform-specific images 106 in some configurations. From operation 320, the creation routine 300 proceeds to operation 330.

In some configurations, the platform-specific images 106 may have different file versions for a particular file. A file may have a different version to accommodate for differences between the platforms each platform-specific image supports. As an example, a driver providing input/output functionality may have slight differences across platforms. In such an example, the file may be of the same type, have the same name and/or GUID (e.g., the same driver) but the binary for that driver may be different due to differences in platform implementation. Such a file may be considered to have different file versions in some configurations.

At operation 330, multiplatform firmware image creation tool 108 identifies those files that have different file versions in the platform-specific firmware images 106 but which will be added to the core file volume in an effort to minimize the overall size of the multiplatform image 112. The multiplatform firmware image creation tool 108 may add a file version to the core file volume when, for example, it is the majority of platform-specific firmware images 106. For example, if there are four platform-specific firmware images 106 to be added to the multiplatform image 112, and a file version is in three of those four multiplatform images, the multiplatform firmware image creation tool 108 may identify the file version as one for inclusion in the core file volume. The different file version, which may be in the fourth platform-specific firmware image, may be added to the platform-specific file volume corresponding to the fourth platform-specific firmware image (at operation 340). In other words, when a file has different versions across the platform-specific images 106, the most frequent version (e.g., the one appearing in the most platform-specific images 106) is identified for inclusion in the core file volume, while the other file versions are identified for inclusion in their respective platform-specific volumes.

In some configurations, a file version may be different across all the platform-specific firmware images 106. That is, each platform-specific firmware image 106 may have a different version of the file. In such configurations, each file version is identified for inclusion in its respective platform-specific file volume (at operation 340).

In some configurations, a first file version and a second file version may be in the same number of platform-specific firmware images 106. In such configurations, the largest sized file version is identified for inclusion in the core file volume (at operation 330), while the other is identified for inclusion in its respective platform-specific firmware file volumes (at operation 340).

An example illustrating how the multiplatform firmware image creation tool 108 performs operations 330 and 340 can be shown with the following example. Suppose the multiplatform firmware image creation tool 108 is generating a multiplatform image 112 for four platforms (Platform 1, Platform 2, Platform 3, and Platform 4) from four platform-specific images 106. There are six drivers (D1, D2, D3, D4, D5, and D6) in the platform-specific images 106, and some of those six drivers have different versions (A, B, C and/or D) as shown in Table 1 below:

| Driver | Platform 1 | Platform 2 | Platform 3 | Platform 4 |
| --- | --- | --- | --- | --- |
| D1 | D1 vA | D1 vA | D1 vA | D1 vA |
| D2 | D2 vA | D2 vA | D2 vA | D2 vB |
| D3 | D3 vA | D3 vA | D3 vB | D3 vB |
| D4 | D4 vA | — | — | — |
| D5 | D5 vA | D5 vB | D5 vC | D5 vD |
| D6 | D6 vA | D6 vA | D6 vB | — |

The multiplatform firmware image creation tool 108 identifies the driver versions for inclusion in either the core file volume or the respective platform-specific volumes in an effort to minimize the overall size of the multiplatform image 112. To do so, in one configuration, the multiplatform image 112 identifies driver versions that are the same in all platforms for inclusion in the core file volume. For example, D1 vA may be identified for inclusion in the core file volume as it is the same across all of Platform 1, Platform 2, Platform 3, and Platform 4.

The multiplatform firmware image creation tool 108 may also identify the version of a driver that occurs the most across the platform-specific images 106 as one to include in the core file volume. For example, for D2, version vA occurs in three of the four platforms, so the multiplatform firmware image creation tool 108 may identify D2 vA for inclusion in the core file volume, while D2 vB is identified for inclusion in the platform-specific file volume (in this case, the platform specific file volume for Platform 4).

When a driver version is different in each of the platform-specific images (e.g., D5), the multiplatform firmware image creation tool 108 of each driver version may identify each driver version for inclusion in its specific platform-specific firmware volume. For example, the multiplatform firmware image creation tool 108 may identify D4 vA for inclusion in the platform-specific firmware volume for Platform 1, D4 vB for inclusion in the platform-specific firmware volume for Platform 2, D4 vC for inclusion in the platform-specific firmware volume for Platform 3, and D4 vD for inclusion in the platform-specific firmware volume for Platform 4.

In some configurations, the number of appearances for two file versions may be the same across the platforms. For example, in Table 1, D3 vA and D3 vB both appear in two of the four platforms. In such configurations, the file version that is largest in size is identified for inclusion in the core file volume. Thus, if vA is larger than vB, the multiplatform firmware image creation tool 108 identifies vA for inclusion in the core file volume, while vB is identified for inclusion in the platform-specific firmware images for Platform 3 and Platform 4.

After identifying different files among the platform-specific images 106 for inclusion in the core file volume (at operation 330) or the platform-specific file volumes (at operation 340), the creation routine 300 then proceeds from the discovery phase to the execution phase. In some embodiments, the multiplatform firmware image creation tool 108 creates a report listing the common and different files in the platform-specific firmware images 106.

The execution phase of operation 300 begins at operation 350, where the multiplatform firmware image creation tool 108 copies the files identified for the core file volume from the platform-specific firmware images 106 to the core FFS volume 220 (for uncompressed files) or to the core FFS volume 260 (for compressed files). The multiplatform firmware image creation tool 108 also copies the files identified for inclusion in platform-specific firmware volumes to their respective platform-specific FFS volumes 232, 235, 238 (for uncompressed files) or to their respective platform-specific FFS volumes 272, 275, 278 (for compressed files) at operation 360.

When the multiplatform firmware image creation tool 108 identifies a file that is different among the platform-specific images 106 for inclusion in the core file volume, it may add or modify the dependency expression (DEPEX) of the file so that it is dependent on a GUID corresponding to the platform for which the file is associated at operation 370. In some configurations, the DEPEX of a file can include a dependency on multiple platforms that is logically OR'ed together.

For example, Table 2, shown below, provides examples of how the multiplatform firmware image creation tool 108 may identify the driver versions illustrated in Table 1 for inclusion in either the core file volume or the platform-specific file volumes for Platforms 1-4, and the associated DEPEX modifications as appropriate:

| Driver | Version | File Volume | DEPEX modification |
|---|---|---|---|
| D1 | vA | Core | N/A |
| D2 | vA | Core | GUID for Platform 1 OR GUID for Platform 2 OR GUID for Platform 3 |
| D2 | vB | Platform 4 | N/A |
| D3 | vA (larger than vB) | Core | GUID for Platform 1 OR GUID for Platform 2 |
| D3 | vB (smaller than vA) | Platform 3 AND Platform 4 | N/A |
| D4 | vA | Core | GUID for Platform 4 |
| D5 | vA | Platform 1 | N/A |
| D5 | vB | Platform 2 | N/A |
| D5 | vC | Platform 3 | N/A |
| D5 | vD | Platform 4 | N/A |
| D6 | vA | Core | GUID for Platform 1 OR GUID for Platform 2 |
| D6 | vB | Platform 3 | N/A |

In some configurations, a multiplatform driver 215 describing the platforms corresponding to the platform-specific firmware images 106 can be created and added to the multiplatform image 112. In some configurations, the multiplatform driver 215 may be written by a developer or created by the multiplatform firmware image creation tool 108 in some configurations. In some configurations, the multiplatform driver 215 is added to the a priori list so that it will be launched early during execution of the multiplatform firmware image 112. The multiplatform driver 215 can include the GUIDs for each of the platforms and other information that may be useful to developers or needed to boot computers implementing the platforms per the UEFI Specification (e.g., string descriptions of the platforms, SKU IDs, etc.). Once the multiplatform firmware image creation tool 108 generates the multiplatform driver 215, it may add it to the multiplatform firmware image.

Figure 4:
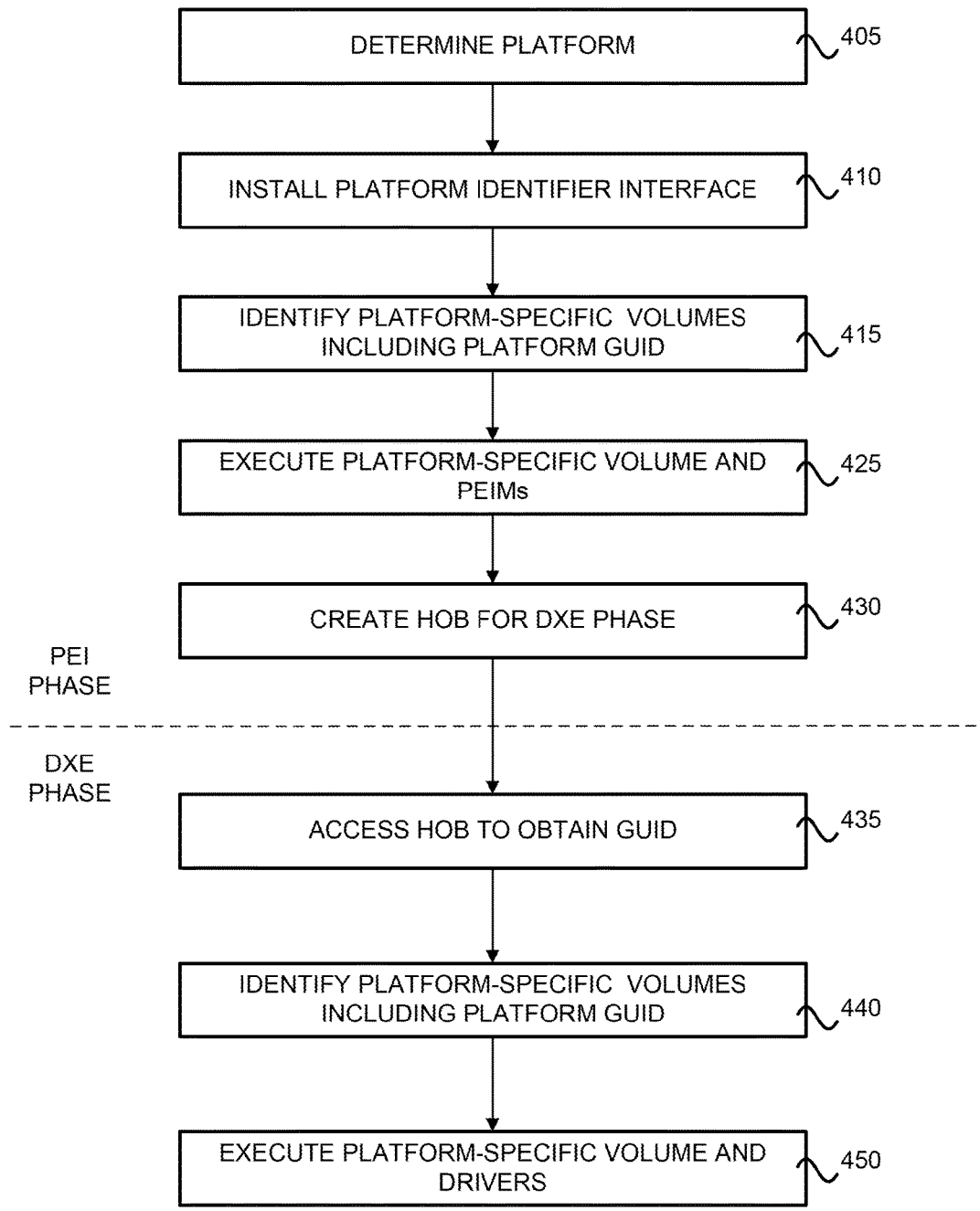
FIG. 4 is a flow diagram showing a routine that illustrates a process for booting a computer using the multiplatform firmware image shown in FIG. 2B, according to one configuration disclosed herein.

FIG. 4 is a flow diagram showing a boot routine 400 that illustrates a process for booting a computer, such as that shown in FIG. 6, which is described below, using the multiplatform firmware image 112 shown in FIGS. 1 and 2B, according to disclosed embodiments. The boot routine 400 can be divided into two phases consistent with the UEFI Specification—operations performed during the memory-limited PEI phase and operations performed during the DXE phase when system memory is more available. According to some embodiments, the PEIM driver 240 performs the operations of the boot routine 400 during the PEI phase and the DXE driver 245 performs the operations of the boot routine 400 during the DXE phase.

The boot routine 400 begins at operation 405, where PEIM driver 240 determines the platform for the computer executing the multiplatform firmware image 112. For example, and without limitation, the configuration of general purpose I/O ("GPIO") pins in the computer might be examined by the library to identify the platform of the computer. Other mechanisms can be utilized in other configurations. The PEIM driver 240 determines the platform GUID for the current system using the multiplatform driver 215. Boot routine 400 then proceeds from operation 405 to operation 410.

At operation 410, the PEIM driver 240 installs the platform identifier interface. In some embodiments, the platform identifier interface is implemented as, and includes, a PEIM-to-PEIM (PPI) interface. The platform identifier interface includes the GUID of the platform determined at operation 410. The boot routine then proceeds from operation 410 to operation 415 where the PEIM driver 240 identifies platform-specific volumes of the boot block FFS volume 210 having a value in their DEPEX matching the platform GUID. Likewise, at operation 420, the PEIM driver 240 identifies the FFS files having the platform GUID in their DEPEX. In some embodiments, the FFS files identified at operation 420 included pre-EFI modules (PEIMs). PEIMs can include executable objects that execute in place and can describe PPIs needed to run them, for example, dependencies in their respective DEPEXs.

The boot routine 400 continues to operation 425 where it executes the files of platform-specific volumes identified in operation 415 and any FFS files having the platform GUID in their DEPEX. The FFS files executed at operation 425 having the platform GUID can include pre-EFI modules (PEIMs). PEIMs can include executable objects that execute in place and can describe PPIs needed to run them, for example, dependencies in their respective DEPEXs.

The execution of the FFS files at operation 425 may be consistent with the dispatching protocols of the UEFI Specification, in some configurations. For example, consistent with the UEFI Specification, the PEIM driver 240 executes the files of the platform-specific volumes and the FFS files in order based on the dependencies defined in their respective DEPEXs.

At operation 430, the PEIM driver 240 creates a hand-off block (HOB) of data to pass to the DXE driver 245. The HOB includes the platform GUID. The boot routine 400 then transitions from PEI phase to DXE phase consistent with the UEFI Specification.

The DXE phase of the boot routine 400 starts with operation 435 where the DXE driver 245 accesses the HOB provided by the PEI phase to access the platform GUID. Using the GUID from the HOB, the DXE driver installs a dummy protocol including the platform GUID and dispatches the platform-specific FFS volumes stored in the main FFS volume 250 that have the platform GUID (at operation 440). Boot routine 400 continues to operation 450 where it executes the files of platform-specific volumes identified in operation 440 and the FFS files stored in the main FFS volume 250 (via core FFS volume 260) that have the platform GUID in their DEPEX. In some embodiments, the FFS files of the platform-specific FFS volumes stored in the main FFS volume 250 and the FFS files stored in the main FFS volume 250 are DXE drivers, consistent with the UEFI Specification. Consistent with the UEFI Specification, the DXE driver 245 executes the files of the platform-specific volumes and the FFS files in order based on the dependencies defined in their respective DEPEXs.

Figure 5:
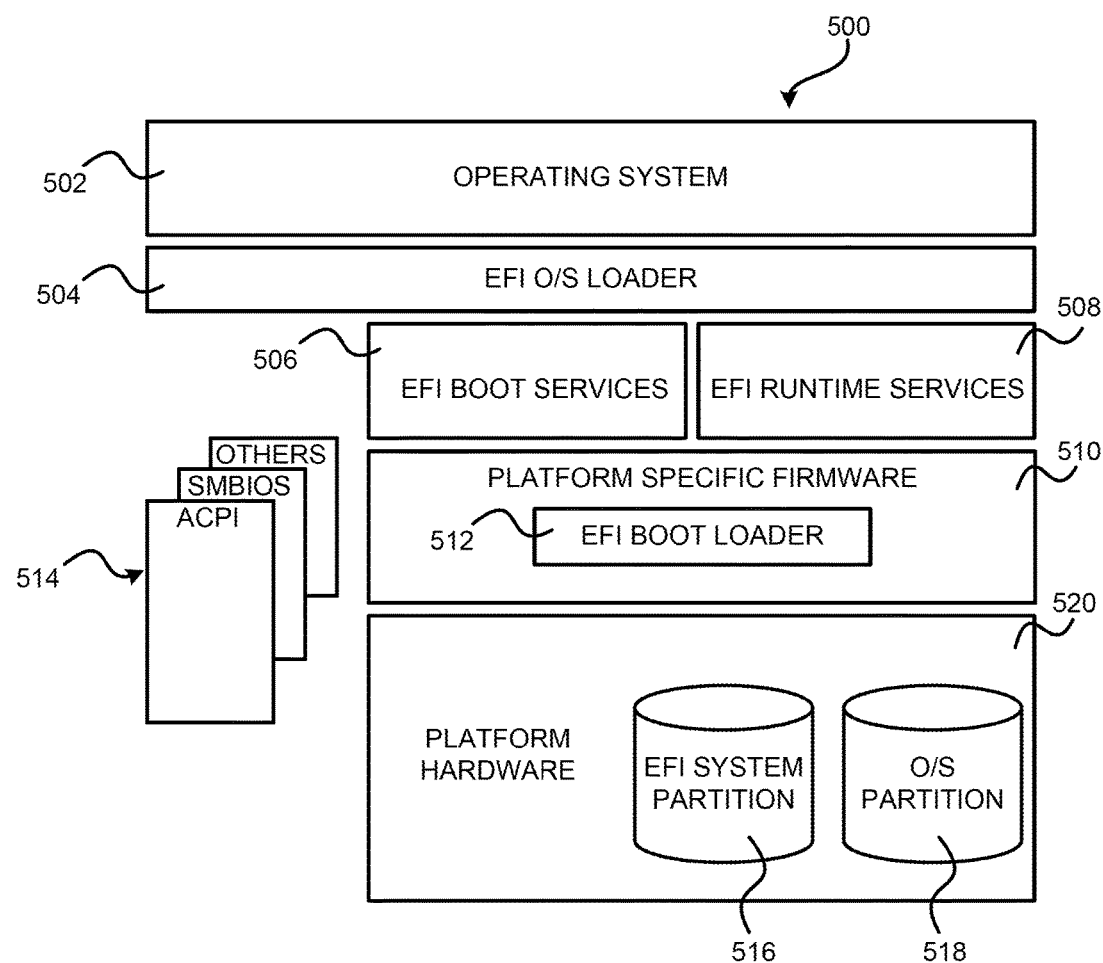
FIG. 5 is a software architecture diagram illustrating a software architecture for an extensible firmware interface ("EFI") -compliant firmware that provides an operating environment for the technologies presented herein in one particular configuration.

Turning now to FIG. 5, a software architecture diagram will be described that illustrates an architecture for a UEFI Specification-compliant firmware that can be created using the technologies disclosed herein. The UEFI Specification describes an interface between an operating system 502 and a UEFI Specification-compliant firmware. The UEFI Specification also defines an interface that the firmware can implement, and an interface that the operating system 502 can use while booting. How the firmware implements the interface can be left up to the manufacturer of the firmware. The UEFI Specification also defines a way for the operating system 502 and firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 502. The operating system ("OS" or "O/S") image can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. For example, a set of runtime services can be presented to ensure appropriate abstraction of base platform hardware resources used by the operating system 502 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
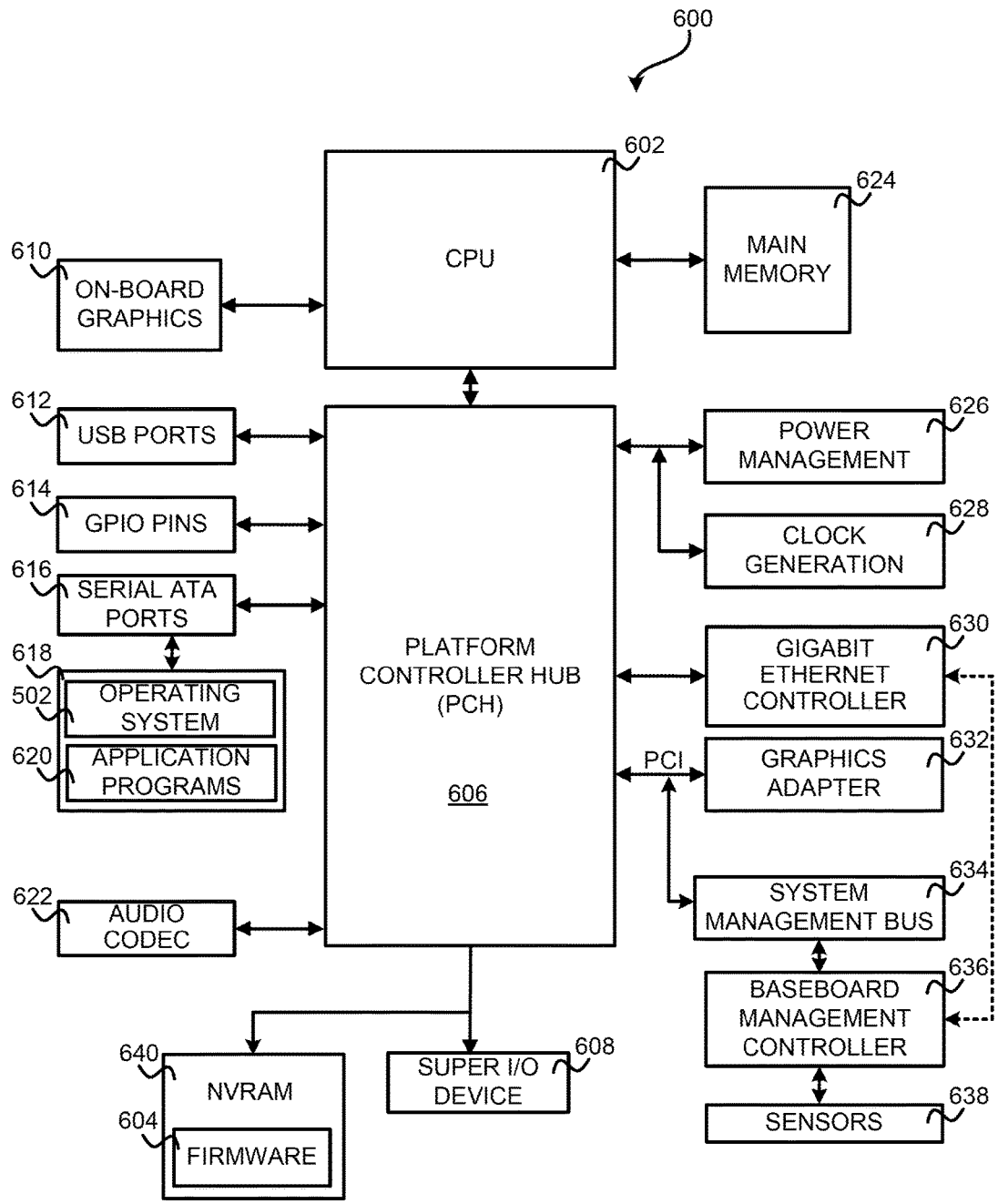
FIG. 6 is a computer architecture diagram that shows an illustrative architecture for a computer that can provide an operating environment for the technologies disclosed herein.

Referring now to FIG. 6, a computer architecture diagram that illustrates an illustrative architecture for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 632. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC'97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs, such as a SATA disk drive 618. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 640 for storing firmware 604 that includes program code containing the basic routines that help to start up the computer 600 and to transfer information between elements within the computer 600. The firmware 604 can be a multiplatform firmware, such as that contained in the multiplatform firmware image 112.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 640. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for multiplatform firmware support have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method comprising:
 accessing a multiplatform firmware image to obtain a platform globally unique identifier (GUID) identifying a particular hardware platform for a computer, wherein the multiplatform firmware image supports a plurality of hardware platforms by comprising:
  a core firmware volume that includes a set of common files that are commonly usable for booting multiple different hardware platforms of the plurality of hardware platforms, and
  a plurality of platform-specific firmware volumes that include sets of platform-specific files that are specific for booting individual hardware platforms of the plurality of hardware platforms;
 installing a platform identifier interface including the platform GUID;
 executing a particular set of platform-specific files contained in a particular platform-specific firmware volume of the plurality of platform-specific firmware volumes including the platform GUID and executing the set of common files of the core firmware volume including the platform GUID based at least in part on:
  dependency expressions of at least some files contained in the particular platform-specific firmware volume and the set of common files of the core firmware volume, and
  the platform identifier interface.

2. The computer-implemented method of claim 1 wherein the method is performed during a pre-Extensible Firmware Interface (PEI) initialization phase of a boot sequence of the computer.

3. The computer-implemented method of claim 2 wherein the platform identifier interface comprises a pre-Extensible Firmware Interface module (PEIM) to PEIM interface.

4. The computer-implemented method of claim 2 wherein the core firmware volume and the plurality of platform-specific firmware volumes are uncompressed.

5. The computer-implemented method of claim 2 further comprising creating a hand-off block (HOB) including the platform GUID.

6. The computer-implemented method of claim 5 further comprising accessing the HOB during a driver execution environment (DXE) phase of the boot sequence of the computer.

7. The computer-implemented method of claim 2 wherein the multiplatform firmware image further comprises a main compressed firmware volume and a plurality of compressed platform-specific firmware volumes, and the computer-implemented method further comprises:
 executing one or more drivers of the main compressed firmware volume including the platform GUID; and
 executing drivers contained in one of the plurality of compressed platform-specific firmware volumes, wherein the one of the plurality of compressed platform-specific firmware volumes includes the platform GUID.

8. The computer-implemented method of claim 1 wherein the multiplatform firmware image further comprises a multiplatform driver indicating a plurality of hardware platforms corresponding to the plurality of platform-specific firmware volumes.

9. The computer-implemented method of claim 8 wherein accessing the multiplatform firmware image to obtain the platform GUID includes executing the multiplatform driver.

10. A non-transitory computer-readable storage medium having computer-executable instructions stored thereupon which, when executed by a computer, cause the computer to perform operations comprising:
 determining a platform globally unique identifier (GUID) identifying a platform for the computer;
 installing a platform identifier interface including the platform GUID;

accessing a multiplatform firmware image that supports a plurality of platforms by comprising:
  a core firmware volume that includes a set of common files that are commonly usable for booting multiple different ones of the plurality of platforms, and
  a plurality of platform-specific firmware volumes that include sets of platform-specific files that are specific for booting individual ones of the plurality of platforms;
executing a particular set of platform-specific files contained in a particular platform-specific firmware volume including the platform GUID and a file external from the plurality of platform-specific firmware volumes including the platform GUID based at least in part on:
  dependency expressions of the particular set of platform-specific files contained in the particular platform-specific firmware volume and the file external from the plurality of platform-specific firmware volumes, and
  the platform identifier interface.

11. The non-transitory computer-readable storage medium of claim 10 wherein the operations are performed during a pre-Extensible Firmware Interface (PEI) initialization phase of a boot sequence of the computer.

12. The non-transitory computer-readable storage medium of claim 11 wherein the platform identifier interface comprises a pre-Extensible Firmware Interface module (PEIM) to PEIM interface.

13. The non-transitory computer-readable storage medium of claim 11 wherein the plurality of platform-specific firmware volumes are uncompressed.

14. The non-transitory computer-readable storage medium of claim 11 wherein the operations further comprise creating a hand-off block (HOB) including the platform GUID.

15. The non-transitory computer-readable storage medium of claim 14 wherein the operations further comprise accessing the HOB during a driver execution environment (DXE) phase of the boot sequence of the computer.

16. The non-transitory computer-readable storage medium of claim 10 wherein the multiplatform firmware image further comprises a multiplatform driver indicating a plurality of platforms.

17. The non-transitory computer-readable storage medium of claim 16 wherein determining the platform GUID includes executing the multiplatform driver.

18. A non-transitory computer-readable storage medium having computer-executable instructions stored thereupon which, when executed by a computer, cause the computer to:
  execute a multiplatform pre-Extensible Firmware Interface module (PEIM) driver during a pre-Extensible Firmware Interface (PEI) phase of a boot sequence of the computer, the multiplatform PEIM driver performing operations comprising:
    accessing a multiplatform firmware image to obtain a platform globally unique identifier (GUID) identifying a platform for the computer, the multiplatform firmware image comprising:
      a main uncompressed firmware volume that includes a set of common files that are commonly usable for booting multiple different ones of a plurality of platforms,
      a plurality of uncompressed platform-specific firmware volumes that include sets of platform-specific files that are specific for booting individual ones of the plurality of platforms,
      a main compressed firmware volume, and
      a plurality of compressed platform-specific firmware volumes,
    installing a platform identifier interface including the GUID,
    executing one or more PEIMs of the main uncompressed firmware volume wherein the one or more PEIMs of the main uncompressed firmware volume include the platform GUID,
    executing PEIMs contained in one of the plurality of uncompressed platform-specific firmware volumes wherein the one of the plurality of uncompressed platform-specific firmware volumes include the platform GUID, and
    creating a hand-off block (HOB) including the platform GUID; and
  execute a multiplatform driver execution environment (DXE) driver during a DXE phase of a boot sequence, the multiplatform DXE driver performing operations comprising:
    accessing the HOB created by the multiplatform PEIM driver to identify the platform GUID,
    identifying one of the plurality of compressed platform-specific firmware volumes including the platform GUID,
    executing one or more drivers of the main compressed firmware volume, wherein the one or more drivers of the main compressed firmware volume including the platform GUID, and
    executing drivers contained in one of the plurality of compressed platform-specific firmware volumes, wherein the one of the plurality of compressed platform-specific firmware volumes includes the platform GUID.

19. The non-transitory computer-readable storage medium of claim 18 wherein the multiplatform firmware image further comprises a multiplatform driver indicating a plurality of platforms.

20. The non-transitory computer-readable storage medium of claim 19 wherein accessing the multiplatform firmware image to obtain the platform GUID includes executing the multiplatform driver.

* * * * *